Patented Feb. 11, 1936

2,030,191

UNITED STATES PATENT OFFICE 2,030,191

MANUFACTURE OF RUBBER

Ralph Morris Ungar, London, England, assignor, by direct and mesne assignments, to Softened Rubber Limited, Manchester, England No Drawing. Application November 17, 1931, Serial No. 575,680. In Great Britain January 9, 1931

11 Claims.  (Cl. 18—50)

This invention relates to the manufacture of rubber and rubber products, and comprises a simple industrial process for softening crude rubber without the usual mechanical breaking down and masticating operations and without the customary addition of softening agents, or substantially without these usual expedients. The crude rubber referred to is rubber in a state prior to vulcanization, and such as is derived from collected natural latex, and the "washed and dried" rubber of commerce.

It is well known that for the majority of purposes in rubber manufacture, the crude rubber must first be plasticised by milling or by some similar operation. Broadly speaking, the quantity of fillers which can be compounded with raw rubber is limited by the extent to which mastication of the rubber can be carried, and the requisite or permissible degree of mastication is, in turn, dependent upon other factors. Thus, if the mastication be insufficient, the mixing will lack homogeneity and will cause trouble in processing, for example, in calendering, tubing, pressing, vulcanizing and so on. On the other hand, if the mastication be excessive, the rubber will be "killed" and after vulcanization, will not recover its desirable qualities, such as strength, resilience and resistance to ageing. Moreover, excessive mastication causes delay in the vulcanization process and leads to porosity in the vulcanized product and other disadvantages. The limits thus obligatorily imposed upon the degree of mastication are particularly troublesome in the production of certain types of goods, for instance, those requiring the incorporation of large quantities of fillers, especially of the light filler type, which, as is known, tend to give a "dry" mixing.

With these considerations in view, it has been customary in the art to resort to the use of softening agents, but softeners can only be used to a limited degree as they tend to influence and change the character of the mixing and also to interfere with the eventual physical properties of the finished rubber.

As will be readily appreciated, therefore, there is a great need in the art for some process or method of softening rubber which will substitute the present mechanical breaking down and mastication methods and the use of softening agents, and the present invention has for its object to meet this need.

It may be remarked that various attempts have already been made to soften rubber. Thus, it has been proposed, in order to obtain a rubber of definite and constant degree of softness, to heat the rubber, prior to mastication and mixing, in an inert, non-oxidizing atmosphere, for example, to heat it in steam in a vessel from which the air has been extracted. Rubber treated in this way, however, is softened only to a limited extent and it rapidly recovers its nerve prior to vulcanization.

Another proposal has been to heat rubber in the presence of air. Several attempts have been made in this direction. Rubber in the form of sheet has been heated up to 150° C. in an electric oven, whereby, after about 60 minutes heating, a product was obtained which was tacky although retaining a considerable degree of elasticity. In a further instance, rubber in solid form was heated in the presence of air for a period of about six hours at a temperature of 130° C. with the production as the result of a pitchy or syrupy mass. This was clearly a case, however, of depolymerization or chemical degradation of rubber with consequent destruction of its nerve and other useful ultimate properties.

According to another proposal still, raw rubber has been rendered more amenable to chlorination by being heated in the presence of oxygen at a temperature of about 60° C., the process in this case being also one of depolymerization and involving a de-nerving of the rubber.

Again, it has been proposed in the specification of United States Patent No. 1,805,713, to soften rubber, preparatory to compounding, by heating it in a closed container in the presence of a mixture of air and wet steam at a temperature of from 240° to 300° F., and, thereafter, to dry the treated rubber, for example by exposing it to the action of low pressure superheated steam. A certain degree of softening is obtained in this process.

I have now found that raw rubber may be reduced to an intensely softened condition, adequate, if not more than adequate, for all practical needs in the art (that is to say, for ready incorporation of the rubber with fillers—even in large quantities and of the light filler type—without the use of softening agents, or with the use of very much less of these agents than has been necessary hitherto, and in addition, with increased facility in the various processing operations and whilst maintaining the desirable physical attributes of the ultimation vulcanized rubber) if the raw rubber be submitted to a carefully controlled process of oxidation embodying the following essential conditions: (a) a dry condition of the rubber, (b) heat-drying the rubber in vacuo first, before exposing it to the oxidizing atmosphere, preferably immediately before and so that the dried rubber is still hot from the drying operation when the oxidizing atmosphere is admitted to it, (c) a dry (water-free) condition of the oxidizing atmosphere, (d) the use of an oxidation temperature strictly within certain narrowly defined limits, namely substantially between 330° and 347° F., (e) a close control of the duration of the oxidation treatment, concluding the latter with a gradual fall in the temperature of the rubber at least down to a temperature in the neighbourhood of 120° F., (f) exposure of the rubber to the oxidizing temperature in a form to present a large area of surface, for example, in the form of crumb.

According to the present invention, therefore, a process for softening crude rubber without permanently de-nerving it, and so as to produce a softened rubber which will be capable of preserving its initial softened and de-nerved condition practically indefinitely until vulcanized, consists in exposing the rubber in substantially water-free condition and in extended-surface form, to a dry oxidizing atmosphere at a temperature substantially between 330° and 347° F., the rubber being thereafter submitted to cooling, still in an oxidizing atmosphere, and the period of oxidation-exposure of the rubber at the temperature stated and the rate of cooling being so controlled as to result in an increase in weight of the rubber of at least 0.5% and preferably not less than 2%.

The period of oxidation-exposure of the rubber at the temperature referred to, namely between 330° and 347° F., will vary somewhat with the character and condition of the rubber to be softened. In the main, however, it has been found that the said period should not be less than about half-an-hour and preferably should be longer than this, optimum results having been fairly consistently obtained with an oxidation-exposure duration of approximately 45 minutes.

Similarly, the rate of cooling of the heated rubber will vary slightly, again with the type and initial condition of the rubber, but a rate according to which the temperature of the rubber falls from the elevated oxidation temperature stated to a temperature in the neighbourhood of 120° F. in about 45 minutes, will, in the main, be found to be the appropriate rate to employ, this rate of cooling having been found to give best results for most rubbers.

Generally speaking, it is preferable, and in most cases, essential, thoroughly to pre-dry the rubber before submitting it to the oxidation step by heat treatment of the rubber in vacuo, the rubber being thereby "opened up" for the action of the oxygen, that is to say, freshly exposed as to its surface not merely superficially but in its interstices or internal surfaces.

For example, if the oxidation process be performed, as it may conveniently, in a vacuum dryer of the Passburg type, with the rubber in crumb form and disposed on the trays of the dryer in layers of about 2 inch thickness, the rubber crumb, in its initial undried condition, may be introduced, in position upon the drier trays, into the vacuum drier and pre-dried therein in vacuo, the temperature of the operating steam supplied to the drier during this step being substantially the same as that subsequently to be employed in the oxidation step, namely between 330° F. and 347° F., which will result in the rubber being heated to about 280° F. in the centre of the layer on the tray. The duration of the initial vacuum treatment thus of the rubber will vary with the type and condition of the rubber. For example in the case of crumb rubber prepared as hereinafter described, the duration of the vacuum treatment will generally be in the neighborhood of two hours. If the rubber be already in a relatively dry condition and/or in an unusually finely divided form, the duration of the vacuum treatment may be considerably less than two hours and vice versa, a preliminary test always sufficing, as in any industrial operation, to determine the optimum conditions of working.

Upon conclusion of the preliminary step of heating in vacuo, the vacuum in the dryer may be broken and air admitted to the hot rubber on the trays, the supply of operating steam being continued to the dryer at the same temperature of 330° to 347° F. and then, after a period of about three quarters of an hour, the trays may be withdrawn from the dryer and piled one upon the other with space between them for the free circulation of air at atmospheric temperature, the rubber being thus permitted or caused to cool down gradually to a temperature in the neighbourhood of 120° F.

Finally, the treated rubber, at this stage, may be homogenized for a few minutes in a mixing mill, pre-heated preferably to about 190° F.

If the crude rubber be exceptionally wet, the necessary duration of the vacuum treatment may be shortened by subjecting the rubber beforehand to a preliminary drying operation, for example, by any well known method, such as ordinary air drying, drying in a kiln or in a current of air, or by centrifuging etc.

It is found that not only may enormous economies be made in the manufacturing costs of rubber goods, owing to the substitution of the simple and short process of softening rubber provided by this invention for the usual costly and time consuming milling and other operations, but the natural nerve of the rubber and other useful properties potential in raw rubber are not interfered with by the softening treatment.

Moreover, the viscosity of the so-called rubber "solutions" when prepared from rubber which has been softened in accordance with the present invention, is very much lower than that of a solution of ordinary masticated rubber, for example, one half or less, and in consequence important economies can be effected in the quantity of solvent employed and in the drying out of the solvent from the impregnated or coated article. Also, owing to the low viscosity of these solutions and similarly of doughs, when prepared from rubber softened in accordance with the invention, the various impregnating, spraying, spreading and like operations, in the application of the solutions or doughs, is greatly facilitated.

Moreover, owing to the absence of the usual softeners, for example, rubber substitutes, the use of which is unnecessary in solutions or doughs produced from softened rubber according to the invention, the physical properties of the ultimate rubber deposited from the solution or dough are greatly enhanced for the deposit consists more exclusively of true rubber.

The softened rubber of this invention is utilizable for the manufacture of rubber goods and products generally, that is to say, wherever it is required to employ rubber in a softened condition, for example, for greater ease of admixture with fillers and the like or of dissolution or dispersion in a solvent or vehicle.

Particularly useful application of the improved softened rubber include the manufacture therefrom of footwear soles and heels and goods of the rubber-leather type, also the production of rubber flooring, paving and like material, more especially of the rigid or semi-rigid kind incorporating relatively large quantities of fillers and reinforcing agents.

It ought perhaps to be remarked that the use in a vulcanizable rubber mix of the improved softened rubber of this invention largely if not entirely eliminates the tendency so common at present for the rubber mix to pre-cure or scorch during the various mixing, extruding, pressing and other operations of mechanical working of the mix prior to the vulcanization step, more especially when employing the higher-powered organic accelerators. Indeed, experience has shown that in a number of cases where the more powerful of the accelerators cannot be employed, owing to this tendency for the mix to pre-cure or scorch, the difficulty may be entirely overcome by resorting to the use of the improved softened rubber of the invention in place of ordinary masticated rubber.

As will be appreciated, therefore, the present invention provides what is really a new type of component rubber for the manufacture of rubber goods and opens up a new field of production of such goods where, hitherto, manufacture has been impossible, owing to the practical limitations imposed upon the permissible proportion of fillers and other rubber addenda in the vulcanizable mix or to the inappropriateness of the inclusion in the rubber of softening agents.

The following examples will serve to indicate how the invention may be carried into effect, both with rubber in the form of sheet and in the disintegrated condition; and it will be understood that these examples are given for illustrative purposes only and that the invention is not limited thereby.

*Example I*

200 kilos of rubber as received from the plantation were roughly cut up into comparatively small pieces. Said plantation rubber may be in the form of crepe, sheet or block. 25 kilos of the cut material were thrown into a Werner-Pfleiderer washer, and were therein reduced to fine crumb. The machine was then emptied, a further charge introduced, and the operation carried on until the whole 200 kilos of rubber had been reduced to crumb. In place of the washer in question, a machine of the Baker-Perkins type was also found to be suitable.

The wet crumb was charged on to the trays of a Passburg vacuum drier, and the temperature of the oven was raised to 340°–345° F. by the passage of steam at 7–8 kilos per square centimetre through the heating elements. The oven was closed, the vacuum pump started, and the pressure in the drying chamber reduced to a few millimetres of mercury. The heating under the vacuum was continued for about two hours. The temperature of the rubber under these conditions was about 280° F. as registered in the centre of a layer about 1 inch thick. The vacuum was then broken and air was permitted to enter the chamber, the heating being continued for about three-quarters of an hour, that is to say, the passage of steam at the pressure stated was maintained for that time.

The trays were taken out of the drier and were piled one over the other, with a space between every two trays so as to allow of free circulation of air over the surface of the rubber in each tray. In about 45 minutes the temperature of the rubber had fallen to approximately 120° F., and a gradual change was observed to take place during this cooling period in the appearance of the rubber surface, which acquired a greasy aspect. It was also found that there was a considerable increase in the weight of the rubber, this increase amounting to roughly 2 per cent.—in other words, 200 kilos of rubber were crumbed and 204 kilos of rubber were obtained.

At the end of the cooling period the charge was dumped into an internal mixer previously heated to about 190° F. and was masticated therein for 3 to 5 minutes for the purpose of homogeneizing the mass and bringing it into a more suitable form for the mixing process.

It was found advantageous in this final treatment of the rubber to have the masticator or mixer, when of the internal type, heated to a comparatively high temperature prior to introduction of the material.

*Example II*

Rubber in the form of sheet about 9 mm. thick was treated under the same conditions as set forth in the previous example. A specific and high degree of softening effect was produced, but was not so marked as in the rubber which had been treated in the same way in the form of crumb, and the increase in weight of the rubber was less, namely, about 0.5–0.75 per cent, instead of the 2 per cent. increase yielded by the crumb. Nevertheless, the treated sheet shared with the rubber crumb the property of retention of the softness for a very prolonged period and, in contradistinction to ordinary masticated rubber, of non-recovery of "nerve" (before vulcanization).

The procedure of the foregoing Example II was carried out with sheet rubber obtained in different ways; from individual sheets separated from a consolidated block thereof by prolonged steeping in hot water; from thin sheet as such, first washed in an ordinary washer; and from sheet cut from a solid rubber block, in every case with the obtention of a product having the special softened character referred to.

To obtain the best results, whatever the form in which the rubber is treated, the essential features of the preferred mode of operating the invention may be thus summed up:—

Subjection of the rubber to a high temperature.

Heating during and, in the presence of air, following the vacuum treatment.

Subjection to oxidative conditions during cooling.

By the present invention a rubber is obtainable which may be regarded as a new form of plasticized rubber. The rubber is very soft, and can take up a much greater quantity of fillers than ordinary rubber or rubber which has been pretreated by heating in steam. Rubber which has been so softened is also far less susceptible to pre-curing, scorching, or "setting up" than rubber which has not been treated by the process of the present invention. This last mentioned advantage is of especial value when active accelerators are employed. Further, the various processing operations such as calendering, tubing and pressing are more readily and more economically effectuated with such softened rubber than with rubber which has not been so treated. Indeed, mixings can be made and processed which could not be handled successfully by the ordinary methods without adversely affecting the quality or nature of the final material.

Compared with re-claimed rubber, rubber softened as herein set forth possesses many advantages, especially in regard to specific gravity, colour, homogeneity of composition, and vulcanizing properties. Moreover, the mechanical and ageing character of goods made with such softened rubber displays various advantages over goods made from re-claim. The softened rubber is also particularly useful for the production of doughs or "solutions" for spreading. In the first place, the viscosity of such solutions is far lower than the viscosity of a solution made from ordinary masticated rubber. This property not only facilitates the "solution" or dispersion of the rubber in the solvents, but also makes it possible to work with much smaller quantities of the latter-considerations of both economic and practical import. For instance, a "solution" which, if made from ordinary rubber, needs 5–6 parts of naphtha (on the rubber) requires, when made from rubber softened according to this invention, only 2–3 parts of this solvent. A method frequently employed for making mixings suitable for spreading fabrics is to include a large quantity of factice, mainly with the view of softening the rubber. But this addition reduces the quality or the grade of the mixing and also the quantity of the more desirable and suitable fillers which could otherwise be embodied. The use of rubber prepared according to this invention call for no such additions which adversely affect the quality or the grade of the mixing, or the quantity of the fillers that it may be desired to include.

Rubber manufactured according to this invention possesses marked advantages in the manufacture of a wide variety of goods, especially those in which the amount of fillers is considerable and yet good mechanical and ageing qualities are of first importance. To take a specific instance: Such softened rubber has been found particularly useful for the manufacture of soles of footwear and heels of the rubber-leather type; and indeed mixings of this character can be successfully employed which would have proved hitherto unamenable to factory processing by the ordinary methods. The same consideration applies to the manufacture of other goods of a rubber-leather type, for instance, such goods as those contemplated in the Specification of British Letters Patent No. 314,783. An additional very important property possessed by softened rubber prepared by the process of this invention is the special capacity for adaptation to the manufacture of rubber floor coverings, pavings, and like materials, especially such as are desired of rigid type and of reduced tendency to cracking and creeping. Such a manufacture forms the subject of the co-pending application for British Letters Patent No. 851 of 1931, and the present invention may be advantageously utilized in conjunction with the invention of this co-pending application.

It is perhaps desirable to emphasize that rubber softened according to this invention maintains that condition for long periods, and that mixings made with such rubber also remain very soft and pliable until after vulcanization. This fact is of very great economical advantage where, for instance, the calendering, tubing and pressing of highly filled and otherwise "dry" mixings are concerned. Such mixings made with softened rubber can, for example, be readily calendered to gauge, whereas the same mixings made with ordinary rubber would be quite unworkable or would cause serious difficulty in working, even if they could be calendered at all. Again, the rubber mixings in question can readily be tubed or extruded, whereas similar mixings made with ordinary rubber would cause difficulties, firstly owing to the mechanical difficulty of extrusion as such, and particularly of extruding to gauge, and secondly, because of the considerable danger of scorching or pre-curing of such mixings if an active accelerator were used.

It will be appreciated that the mode of treatment of rubber according to the present invention is quite distinguished from known practice in that the softened rubber is manufactured without mechanical treatment, such as milling or other power working and, in fact, the material obtainable is so distinctive in comparison with rubber as ordinarily produced by mastication as to be justifiably designated as a new form of prepared raw rubber.

What I claim is:—

1. A process for softening and de-nerving crude rubber so that the softened and de-nerved condition is permanent until the rubber is vulcanized, which consists in exposing the rubber, in substantially water-free condition and in extended-surface form, to air substantially between 330°–347° F., the rubber being thereafter submitted to cooling in air, the period of oxidation exposure of the rubber at the temperature stated and the rate of subsequent cooling being so controlled as to result in an increase in weight of the rubber between approximately 0.5% and 2%.

2. A process for softening and de-nerving crude rubber so that the softened and de-nerved condition is permanent until the rubber is vulcanized, which consists in exposing the rubber, in substantially water-free condition and in extended-surface form, to air between 330°–347° F., the exposure being for a period of about forty-five minutes and then cooling the heated rubber in air at such a rate that the result of the process is an increase in weight of the rubber between approximately 0.5% and 2%.

3. A process for softening and de-nerving crude rubber so that the softened and de-nerved condition is permanent until the rubber is vulcanized, which consists in exposing the rubber, in substantially water-free condition and in extended-surface form, to air between 330°–347° F., the exposure of the rubber being for a period of about three-quarters of an hour, and then cooling the heated rubber in air at such a rate that the result of the process is an increase in weight of the rubber of more than 0.5%.

4. A process for softening and de-nerving crude rubber so that the softened and de-nerved condition is permanent until the rubber is vulcanized, which consists in exposing the rubber, in substantially water-free condition and in exended-surface form, to air between 330°–347° F., the exposure of the rubber being for a period of time of about forty-five minutes and then gradually cooling the heated rubber down to about 120° F., so as to result in an increase in weight of the rubber of between approximately 0.5% and 2%.

5. A process for softening and de-nerving crude rubber so that the softened and de-nerved condition is permanent until the rubber is vulcanized, which consists in exposing the rubber, in substantially water-free condition and in crumb form, to air at a temperature between 330°–347° F. for about three-quarters of an hour and then cooling the heated rubber down to about 120° F. in approximately forty-five minutes in air having free access to the rubber.

6. A process for softening and de-nerving crude rubber so that the softened and de-nerved condition is permanent until the rubber is vulcanized, which consists in exposing the rubber, in substantially water-free condition and in extended-surface form, to air substantially between 330°–347° F., the rubber being thereafter submitted to cooling in air, and the period of oxidation exposure of the rubber at the temperature stated and the rate of subsequent cooling being so controlled as to result in an increase in weight of the rubber of about 2%.

7. A process for softening and de-nerving crude rubber so that the softened and de-nerved condition is permanent until the rubber is vulcanized, which consists in thoroughly heat-drying the rubber in vacuo and in extended-surface form, exposing the so-dried rubber to air at a temperature substantially between 330°–347° F., and thereafter submitting the rubber to gradual cooling in air so as to produce an increase in weight of the rubber of upwards of from 0.5 to 2.0%.

8. A process for softening and de-nerving crude rubber so that the softened and de-nerved condition is permanent until the rubber is vulcanized, which consists in thoroughly heat-drying the rubber in vacuo and in crumb form, exposing the so-dried rubber to air between 330°–347° F., and the exposure being for a period of substantially three-quarters of an hour and thereafter submitting the rubber to gradual cooling in air so as to produce an increase in weight of the rubber of upwards of from 0.5 to 2.0%.

9. A process for softening and de-nerving crude rubber so that the softened and de-nerved condition is permanent until the rubber is vulcanized, which consists in thoroughly heat-drying the rubber in vacuo and in crumb form, immediately, while it is still hot, exposing the so-dried rubber for approximately forty-five minutes to air at a temperature between 330°–347° F., and thereafter causing the rubber to cool down in air to about 120° F. in approximately 45 minutes.

10. A process for softening and de-nerving crude rubber so that the softened and de-nerved condition is permanent until the rubber is vulcanized, which consists in thoroughly heat-drying the rubber in vacuo and in crumb form, at an average rubber temperature of about 280° F., immediately, while it is still hot, exposing the so-dried rubber for about forty-five minutes to air at a temperature between 330°–347° F., and thereafter causing the rubber to cool down in air to about 120° F. in approximately 45 minutes.

11. A process for softening and de-nerving crude rubber so that the softened and de-nerved condition is permanent until the rubber is vulcanized, which consists in disposing the rubber in crumb form in spaced layers in a vacuum drier, thoroughly heat-drying it in vacuo in the drier at an average rubber temperature at the centre of the layer of about 280° F., breaking the vacuum in the drier by admitting air thereto but continuing the heating at an air temperature in the drier of between 330° F. and 347° F. for a period of about 45 minutes, and thereafter causing the rubber to cool down to about 120° F. in approximately 45 minutes.

RALPH MORRIS UNGAR.